US006861169B2

(12) United States Patent
Hagan et al.

(10) Patent No.: US 6,861,169 B2
(45) Date of Patent: Mar. 1, 2005

(54) COGENERATION OF POWER AND HEAT BY AN INTEGRATED FUEL CELL POWER SYSTEM

(75) Inventors: Mark R. Hagan, Somerville, MA (US); Matthew H. Dorson, Arlington, MA (US); Lawrence G. Clawson, Dover, MA (US); Michael Leschiner, Norwood, MA (US)

(73) Assignee: Nuvera Fuel Cells, Inc., Cambridge, MA (US)

( * ) Notice: Subject to any disclaimer, the term of this patent is extended or adjusted under 35 U.S.C. 154(b) by 203 days.

(21) Appl. No.: 10/141,493

(22) Filed: May 8, 2002

(65) Prior Publication Data

US 2002/0172846 A1 Nov. 21, 2002

Related U.S. Application Data

(60) Provisional application No. 60/289,851, filed on May 9, 2001.

(51) Int. Cl.[7] ................................................ H01M 8/18
(52) U.S. Cl. ............................... 429/20; 429/12; 429/26
(58) Field of Search ............................ 429/12, 20, 26

(56) References Cited

U.S. PATENT DOCUMENTS

| 4,120,787 A | 10/1978 | Yargeau |
| 4,125,090 A | 11/1978 | Masunaga et al. |
| 4,344,849 A | 8/1982 | Grasso et al. |
| 5,023,151 A | 6/1991 | Landau et al. |
| 5,143,149 A | 9/1992 | Kronberg |
| 5,335,628 A | 8/1994 | Dunbar |
| 5,401,589 A | 3/1995 | Palmer et al. |
| 5,441,821 A | 8/1995 | Merritt et al. |
| 5,462,817 A | 10/1995 | Hsu |
| 5,537,956 A | 7/1996 | Rennfeld et al. |
| 5,605,770 A | 2/1997 | Andreoli et al. |
| 5,624,964 A | 4/1997 | Cimini et al. |
| 5,751,604 A | 5/1998 | Yamauchi |
| 5,766,786 A | 6/1998 | Fleck et al. |
| 5,819,843 A | 10/1998 | Inoue et al. |
| 5,948,221 A | 9/1999 | Hsu |
| 5,969,435 A | 10/1999 | Wilhelm |

(List continued on next page.)

FOREIGN PATENT DOCUMENTS

| EP | 1 045 127 A2 | 10/2000 |
| EP | 1 056 148 A2 | 11/2000 |
| EP | 1 045 127 A3 | 12/2001 |
| EP | 1 056 148 A3 | 12/2002 |
| JP | 2000294264 A | 10/2000 |
| WO | WO 01/17951 | 3/2000 |
| WO | WO 01/50541 | 7/2001 |
| WO | WO 01/71838 | 9/2001 |

OTHER PUBLICATIONS

Gummert, Guido, *Using PEFC for Total Energy Supply of Buildings, Decentralized Power 2000*, Intertech, Feb., 2000.
Vogel, Bernd, "Small Scale Fuel Cell Based Cogeneration—Application Potentials and Marker Strategies, *Decentralized Power 2000*," Intertech, Feb., 2000.
International Search Report for International Application No. PCT/US2002/014707, now International Publication No. WO 2002/091508, 2 pages, mailed Apr. 3, 2004.

*Primary Examiner*—Dah-Wei Yuan
(74) *Attorney, Agent, or Firm*—Wallenstein Wagner & Rockey, Ltd.

(57) ABSTRACT

Interconnection layouts are described that are particularly effective in the construction of a steam reformer/fuel cell combination for providing domestic heat and/or hot water as well as electricity. A distinguishing feature of the interconnections is that they permit the operator to optimize the efficiency of operation of the integrated system, and provide a higher efficiency at optimum operation compared to prior art designs. Combinations of reformer/fuel cell systems with conventional furnaces or boilers are also described.

20 Claims, 6 Drawing Sheets

U.S. PATENT DOCUMENTS

| | | |
|---|---|---|
| 5,985,474 A | 11/1999 | Chen et al. |
| 6,013,385 A | 1/2000 | DuBose |
| 6,025,403 A | 2/2000 | Marler et al. |
| 6,033,793 A | 3/2000 | Woods et al. |
| 6,042,956 A | 3/2000 | Lenel |
| 6,083,637 A | 7/2000 | Walz et al. |
| 6,120,923 A * | 9/2000 | Van Dine et al. .............. 429/17 |
| 6,276,473 B1 | 8/2001 | Zur Megede |
| 6,290,142 B1 | 9/2001 | Togawa et al. |
| 6,316,137 B1 | 11/2001 | Kralick |
| 6,379,826 B1 | 4/2002 | Lacy |

* cited by examiner

COGENERATION OF POWER AND HEAT BY AN INTEGRATED FUEL CELL POWER SYSTEM

RELATED APPLICATIONS

This application claims priority of Provisional Application No. 60/289,851 filed May 9, 2001.

TECHNICAL FIELD

Generally, the present invention relates to methods and apparatus for the cogeneration of power and heat from a single system. More particularly, the invention relates to the use of a fuel cell stack and an associated fuel processor assembly (i.e., a fuel reforming system) to provide both electricity and heating for a particular site, such as a building or a group of buildings.

BACKGROUND OF THE INVENTION

A fuel processor converts a fuel, typically a hydrocarbon (and including related materials such as alcohols) into a mixture of hydrogen ($H_2$), carbon dioxide ($CO_2$), and often other components. The key reaction steps are dissociating the fuel in the presence of water (as steam) and heat, typically at 700 to 1000 deg. C., into a mixture of carbon monoxide (CO) and H; using the "water gas shift" to convert the $CO_2$ into CO and $H_2$ by reaction with steam; and subsequent cleanup steps, where required, to remove trace materials which would inhibit the fuel cell reaction. The resulting hydrogen-containing gas is usually referred to as "reformate".

The reformate is supplied to the anode of a fuel cell, and oxygen or air is supplied to the cathode. The electrodes are separated by a semipermeable barrier that passes only selected components of water (typically H+ or OH− or $O_2$−), while electrons travel through an external circuit as an electric current. Various types of fuel cells are known. The systems of the invention are particularly adapted to a PEM (polymer electrolyte membrane) type of fuel cell, in which the membrane passes only H+ ions. Current versions of such membranes require humidification to operate, and are limited to temperatures below about 100 deg. C. However, many of the attributes of the systems of the invention will be applicable to PEM cells operating at higher temperatures, or to other low-temperature (for instance, less than about 200 deg. C.) fuel cell types.

It has been proposed that a small fuel cell, optionally with a small reformer if hydrogen is not available, could be integrated with a building or a group of buildings to use both the electricity and the waste heat of either the fuel cell or the reformer to provide space heating and/or water heating, as well as locally generated electricity. This is known as cogeneration. Generally, the electricity will be used in building(s), or exported to an electric grid, and the waste heat of the fuel cell will be used to provide space heating and/or hot water. Reformer waste heat is in some cases also considered for heating use. Thus, the "fuel cell power system", or FCPS, comprising a reformer, a fuel cell, and ancillary apparatus, "co-generates" both electricity and heat for use at a site.

U.S. Pat. No. 5,985,474 to Chen et al. discloses an integrated system which includes a fuel cell assembly for supplying electrical power to a building, a furnace having a heating chamber and a heat exchanger for supplying heat to the building, and a reformer for providing a supply of reformate directly to the furnace and the fuel cell assembly.

U.S. Pat. No. 6,013,385 to DuBose discloses a fuel cell gas management system including a cathode humidification system for transferring latent and sensible heat from an exhaust stream to the cathode inlet stream of the fuel cell; an anode humidity retention system for maintaining the total enthalpy of the anode stream exiting the fuel cell equal to the total enthalpy of the anode inlet stream; and a cooling water management system having segregated deionized water and cooling water loops interconnected by means of a brazed plate heat exchanger.

U.S. Pat. No. 6,290,142 to Togawa et al. discloses a cogeneration apparatus arranged to properly respond to a plurality of separate demands for supplying the thermal energy. A controller controls the operation of the engine generator in response to the conditions of thermal loads and determined by the measurements of temperature detected by the temperature sensors TS1 and TS2.

U.S. Pat. No. 5,335,628 to Dunbar discloses a fuel cell and a boiler coupled in such a manner that the water used to capture excess heat generated by the fuel cell is used for boiler feedwater heating. In one embodiment, steam generated by the boiler is used in an operation that converts the steam to condensate, and the condensate is returned to the fuel cell for use as a heat sink for the thermal energy generated within the fuel cell unit.

U.S. Pat. No. 5,969,435 to Wilhelm discloses a DC power system which receives AC electrical power and DC electrical power from separate first and second sources simultaneously. The DC power system delivers DC electrical power to an output for use by a load requiring DC power. The DC power system includes a converter to convert AC electrical power to DC electrical power and a power sharing control device to control and distribute the DC electrical power to an output.

The present invention distinguishes over prior art attempts by providing an efficient and effective cogeneration system. In particular, the prior art fails to teach where in the process heat is available for reclamation, and how such heat can be used without significantly decreasing either the efficiency or the reliability of a fuel cell/fuel processor system. These issues are far from trivial. There are many potential sources of heat in the system, including but not limited to the burner or burners, the reformer, the water-gas-shift reactors, a preferential oxidation (cleanup) reactor, the fuel cell stack, and various heat exchange fluids which may be shared among these components. Such fluids include, but are not limited to, water, steam, air, exhaust, fuel and reformate. It is not self-evident which sources can be used to provide heating value without disturbing the efficiency of the other components or the stability of the operating system. Moreover, the various components of the system operate at a variety of different temperatures, ranging from as high as about 700 to 1000 deg. C. in reforming, (or even higher in a burner), down to around 50 deg. C. (reformate entering a PEM stack), and even further down to around 20 deg. C. (water entering the system).

The present inventors have investigated and solved these problems by designing, and constructing or simulating, various potential cogeneration systems. Improved interconnections and devices for extracting heat from a FCPS (fuel processor/fuel cell system) have been discovered which allow the FCPS to operate at least as efficiently as similar non-cogeneration systems. Moreover, the systems of the present invention are typically simple to operate, with a tendency to self-regulate. Additionally, they can recover water efficiently and can easily be integrated with a conventional furnace or boiler used for heating. Therefore, the present invention is provided to solve the problems discussed above and other problems.

SUMMARY OF THE INVENTION

It is an aspect of one embodiment of the invention to provide a cogeneration system with separate fluid loops. The cogeneration system has a first fluid loop for providing steam to a fuel reforming reaction to produce a hydrogen-rich reformate. There is a fuel cell stack for generating electricity from the hydrogen-rich reformate and a second fluid loop for controlling the temperature of the fuel cell stack. The system also has a third fluid loop for removing heat from at least one of the first and second loops for use in a cogenerative application such as space heating and/or water heating. In this description, unless otherwise stated, the word "loop" will also include any path in which water passes through the system but is not recirculated. Examples of a path include but are not limited to the heating of potable water, and may also include replacement rather than recycling of condensate from the reformer's burner exhaust.

It is also an aspect of one embodiment of the invention to provide a cogeneration system with a fuel processor assembly. The fuel processor assembly has a burner for burning a fuel to supply energy for a reforming reaction to produce a hydrogen-rich reformate and a fuel processor exhaust, which is used in a cogenerative application to provide space heat and heat for potable water. The system also has a fuel cell stack for generating electricity from the hydrogen-rich reformate and a fuel cell exhaust which is used in a cogenerative application to provide space heat and heat for potable water.

It is another aspect of one embodiment of the invention to provide a cogeneration system having a fuel cell stack for generating electricity from a hydrogen-rich reformate and a fuel cell coolant for cooling the fuel cell stack. At least one of the fuel cell coolant, the hydrogen-rich reformate and the fuel cell stack are in heat exchange with at least one of the fuel cell coolant, the hydrogen-rich reformate and the fuel cell stack to maintain a fixed temperature difference. This reduces mechanical stress in the fuel cell stack.

It is still another aspect of one embodiment of the invention to provide a cogeneration system having a fuel cell stack for generating electricity from a hydrogen-rich reformate and a fuel cell coolant for cooling the fuel cell stack. At least one of the fuel cell coolant, the hydrogen-rich reformate and the fuel cell stack are in heat exchange with at least one of the fuel cell coolant, the hydrogen-rich reformate and the fuel cell stack to maintain a difference within a set range of temperatures. This reduces mechanical stress in the fuel cell stack.

It is yet another aspect of one embodiment of the invention to provide a condensing radiator for recovering water from an exhaust of a cogeneration system. The condensing radiator has a first zone in which heat is transferred to a fluid loop providing space heating and a second zone in which heat is transferred to a supply of potable water.

It is still another aspect of one embodiment of the invention to provide a cogeneration system having a fuel processor assembly. The fuel processor assembly has a burner for burning a fuel to supply energy for a reforming reaction to produce a hydrogen-rich reformate and a fuel processor exhaust which is used in a cogenerative application. The system also has a fuel cell stack for generating electricity from the hydrogen-rich reformate. There are a plurality of dissociated fluid circulation loops to reduce corrosive effects. A first loop provides steam to a fuel reforming reaction to produce a hydrogen-rich reformate. A second loop maintains operable conditions in the fuel cell stack. A third loop removes heat from the cogeneration system for use in a cogenerative application, the heat being previously extracted from the exhaust of at least one of either the fuel processor and the fuel cell. A fuel cell coolant circulates in the second fluid loop. This fuel cell coolant is in heat exchange with the hydrogen-rich reformate to equilibrate temperatures of the fuel cell coolant and the hydrogen-rich reformate prior to entering the fuel cell stack in order to reduce mechanical stress in the fuel cell stack.

It is yet another aspect of one embodiment of the invention to provide a cogeneration system having a fuel cell stack for generating electricity from the hydrogen-rich reformate. The system has two dissociated and different fluid loops to reduce corrosive effects in the cogeneration system. The fluid loops are selected from the group consisting of a first fluid loop for providing steam to a fuel reforming reaction to produce a hydrogen-rich reformate, a second fluid loop for maintaining operable conditions in the fuel cell stack, and a third fluid loop for removing heat from the cogeneration system for use in cogenerative applications, the heat being previously extracted from an exhaust.

It is still another aspect of one embodiment of the invention to provide a cogeneration system comprising a first fluid loop for providing steam to a fuel reforming reaction to produce a hydrogen-rich reformate, wherein fluid is pumped from a reservoir to each of a first heat exchanger, a fuel processor assembly, a second heat exchanger, a third fluid recovery heat exchanger, then returned to the reservoir; a second fluid loop for controlling the temperature of the fuel cell stack, wherein fluid is pumped from the third fluid recovery heat exchanger to each of a fourth cogeneration heat exchanger, a fifth reformate cooling heat exchanger, a fuel cell stack, a saturator, then returned to the third fluid recovery heat exchanger; a third fluid loop for providing space heating, wherein heat for cogeneration is transferred via the third fluid loop from the fourth cogeneration heat exchanger to a radiator; and a fourth fluid loop for heating potable water, wherein heat for cogeneration is transferred via the fourth fluid loop from the third fluid recovery heat exchanger to potable water.

It is yet another aspect of one embodiment of the invention to provide a cogeneration system having multiple fluid loops. There is a first fluid loop for providing steam to a fuel reforming reaction to produce a hydrogen-rich reformate, wherein fluid is pumped from a reservoir to each of a first heat exchanger, a fuel processor assembly, a second heat exchanger, a third fluid recovery heat exchanger, then returned to the reservoir. There is a second fluid loop for controlling the temperature of the fuel cell stack, wherein fluid is pumped from a fourth cogeneration heat exchanger to each of a saturator, a fuel cell stack, then returned to the fourth cogeneration heat exchanger. There is a third fluid loop for providing space heating, wherein fluid is pumped from the third fluid recovery heat exchanger to each of a fourth cogeneration heat exchanger, a radiator, a fifth reformate cooling heat exchanger, then returned to the third fluid recovery heat exchanger. There is also a fourth fluid loop for heating potable water, wherein heat for cogeneration is transferred via the fourth fluid loop from the third fluid recovery heat exchanger to potable water.

It is still another aspect of one embodiment of the invention to provide a heat exchange system for the provision of electricity and heat from a cogeneration system. A first fluid loop provides steam to a fuel reforming reaction to produce a hydrogen-rich reformate and a reformer exhaust. There is a fuel cell stack for generating electricity from the hydrogen-rich reformate. A second fluid loop controls the temperature of the fuel cell stack. A third fluid loop removes heat from at least one of the fuel reforming reaction and the fuel cell stack for use in a cogenerative application. There is a first heat exchanger between the hydrogen-rich reformate and at least one other system fluid and a second heat exchanger between the reformer exhaust and at least one other fluid. There is also a third heat exchanger between the second fluid loop and the third fluid loop. The system produces heat for at least one of hot potable water and space heating.

It is yet another aspect of one embodiment of the invention to provide the selection of certain heat sources for supplying heat to a cogeneration system. These heat sources include a heat exchanger in the cooler portion of the exhaust of the burner or burners supplying heat to the reforming reaction; a heat exchanger for cooling the reformate between the final preferential oxidation reactor (PrOx) and the stack; and a heat exchanger for extracting the heat of reaction from the fuel cell stack coolant.

It is still another aspect of one embodiment of the invention to provide heat transfer between the reformer and stack, and space heating or water heating loops, which is substantially or entirely achieved by use of a limited number of heat exchangers. In particular, it is found that three heat exchangers can be sufficient. Several different interconnection layouts of circulation through the limited number of heat exchangers are found to be similar in overall efficiency, with the choice among them depending on the particular details of the system.

It is still another aspect of one embodiment of the invention to provide connections of the heat transfer loops of the system with a conventional furnace.

It is yet another aspect of one embodiment of the invention to provide the relative sequence of connection of loops with one another, and their physical arrangement within certain heat exchangers. In particular, one embodiment is described having a space heating loop, a water heating loop, and a condensing heat exchanger for the burner exhaust.

It is yet another aspect of one embodiment of the invention to provide a radiator for cooling at least the stack cooling loop when heat generated by the FCPS is in excess of that required for cogeneration use.

These and other aspects and advantages will become apparent when the Description below is read in conjunction with the accompanying Drawings.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In the description below, the fuel processor is largely treated as a single unit (the "Fuel Processor Assembly," or FPA) even though it contains several chemical reactors interlinked by heat exchange, steam generation, and fuel and air preheating. In particular, any of the three principal types of reforming reaction (partial oxidation, autothermal reforming, and steam reforming) may be used. The FPA will preferably have at least one burner, for one or more of combustion of hydrogen returned from the fuel cell; to drive the reforming reaction, or otherwise to recover its heat value; and to prevent emission of possibly hazardous materials into the atmosphere. If more than one burner is present, their outputs typically are substantially the same for the purposes of the invention. Some of these heat exchanges are represented schematically by HX1 and HX2 in the figures below. HX1 is typically a steam generator operating on the heat of the hotter regions of the burner exhaust duct. HX2 represents the use of other heat sources to initially or subsequently heat water into steam for use in the reforming reaction. Either of these sources, or the terminal PrOx reactor, may also supplement the principal heat exchange reactions described below. At another level of abstraction, the FPA and the stack can be joined together when considering their cooperation with an auxiliary furnace or boiler (herein, both auxiliary furnace and boiler are covered by the word "furnace".)

As drawn, the figures show the main elements enclosed in boxes, omitting excessive detail—e.g., control valves, air and fuel flow, water separators, pumps, compressors, pressure regulators, minor water returns, etc.—in order to focus on the primary heat exchange interconnections and system configurations to achieve more effective and more efficient cogeneration. Provision of these necessary items is required for operation of the system, but is not for understanding the invention. Several embodiments of the invention will now be described to show some ways in which the invention can be implemented.

Figure 1:
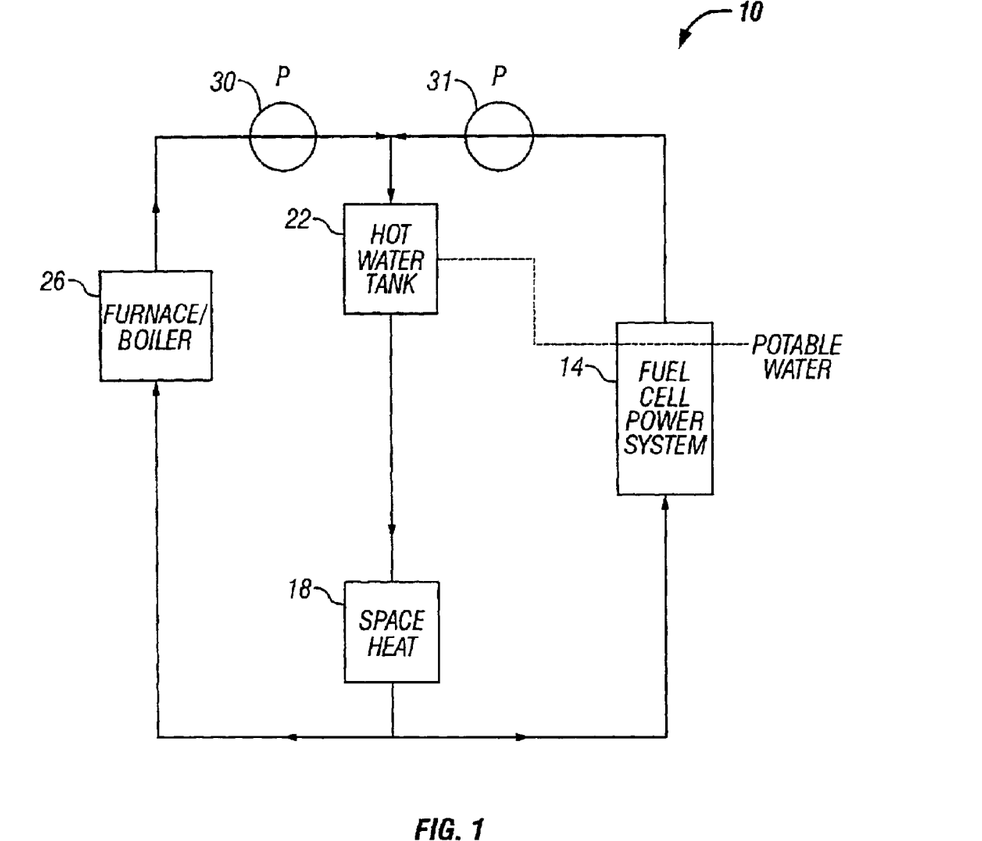
FIG. 1 is a schematic illustrating the interaction of the circulation patterns of one embodiment of the invention with a co-operative conventional furnace or boiler.

Referring to FIG. 1, a schematic illustrating the interaction of the circulation patterns of one embodiment of the invention is shown. Fluids are pumped by pumps 30 and 31 using conventional pumping methods in the embodiment of the cogeneration system 10. The fluids are pumped through the FCPS 14 and the furnace 26 to both a hot water tank 22 and a space heater 18, then returned to the FCPS 14 and the furnace 26.

Figure 2:
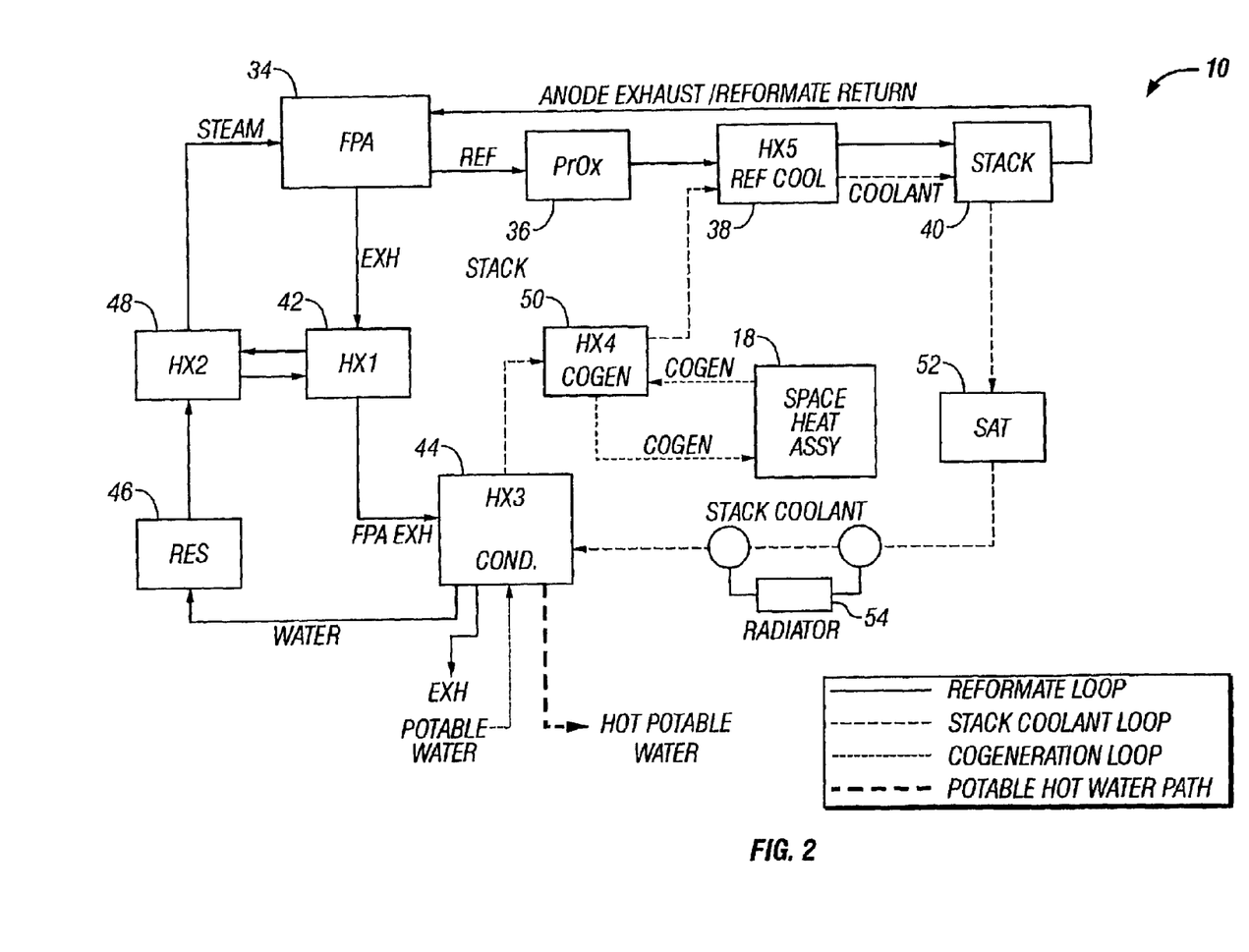
FIG. 2 is a schematic illustrating particular heat transfer and fluid circulation patterns exemplifying one embodiment of the invention.
Figure 3:
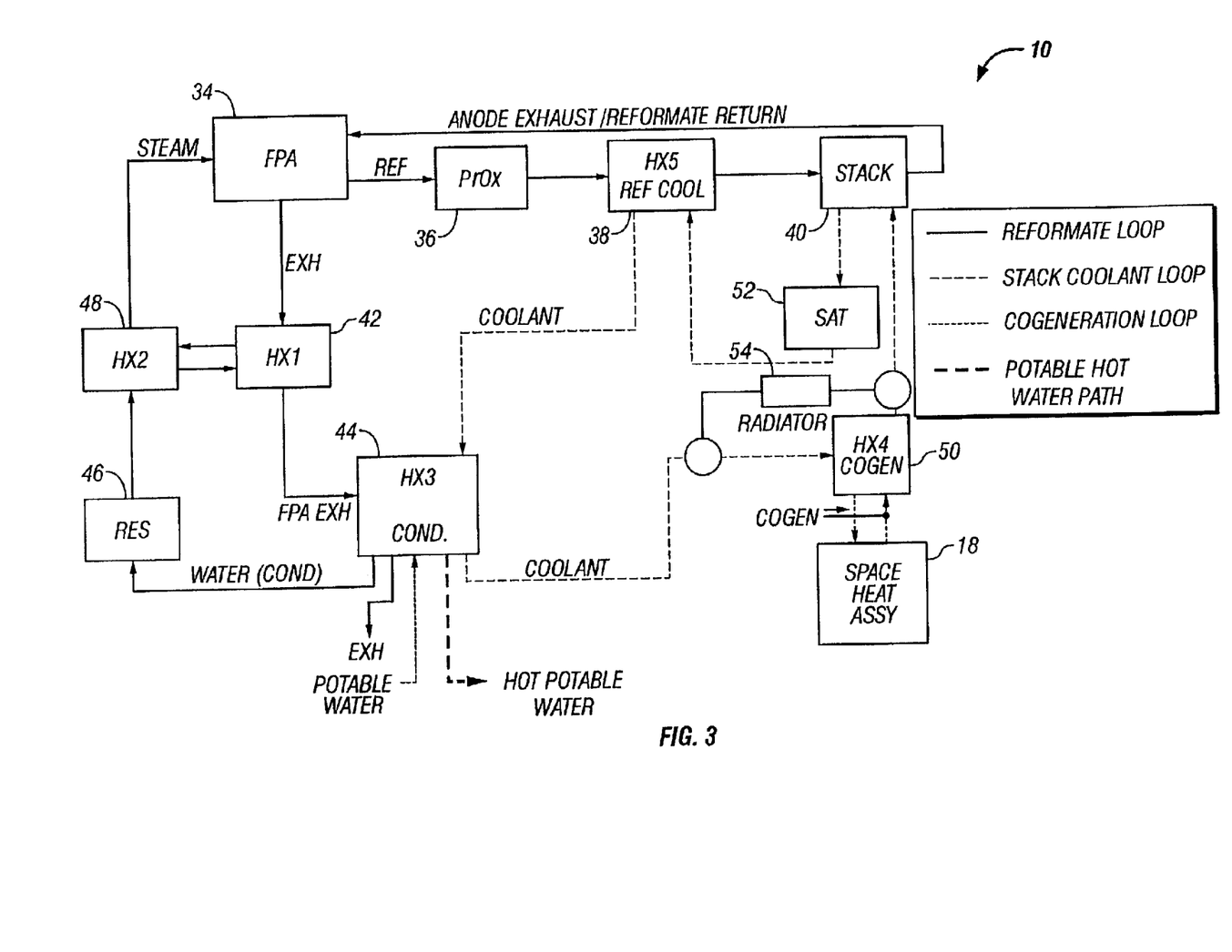
FIG. 3 is a schematic illustrating particular heat transfer and fluid circulation patterns exemplifying one embodiment of the invention.
Figure 4:
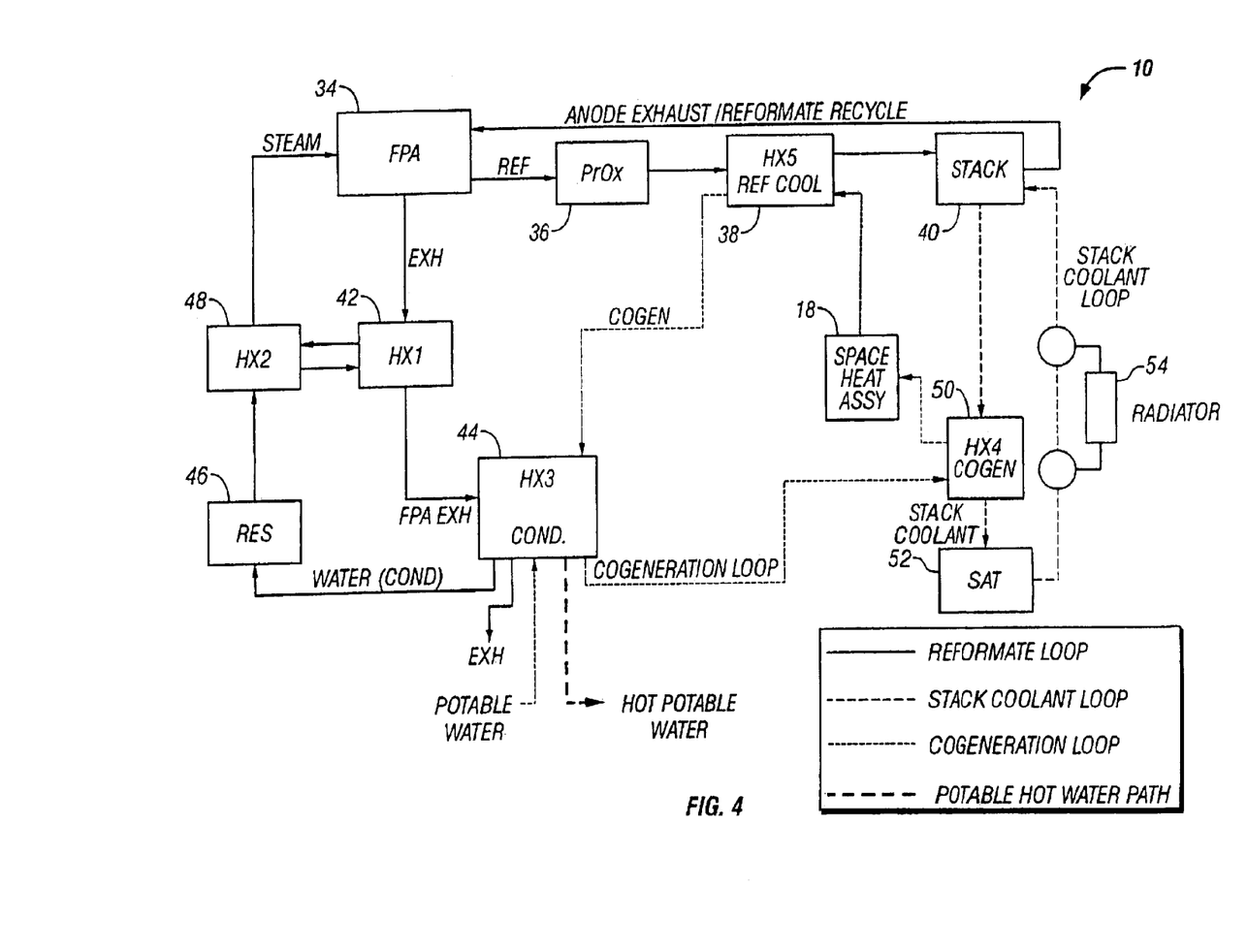
FIG. 4 is a schematic illustrating particular heat transfer and fluid circulation patterns exemplifying one embodiment of the invention.

Referring to FIGS. 2 thru 4, embodiments of a cogeneration system 10 of the present invention are illustrated. In each cogeneration system 10, there is a fuel cell stack 40 for generating electricity from a hydrogen-rich reformate and a fuel cell exhaust which may be used in a cogenerative application to provide space heat and/or heat for potable water.

As can be seen in FIGS. 2 thru 4, the cogeneration system may have a plurality of dissociated fluid loops. This helps to minimize corrosive effects. The first fluid loop may provide steam to a fuel reforming reaction to produce a hydrogen-rich reformate. A second fluid loop may circulate a fuel cell coolant to control the temperature of the fuel cell stack 40.

The system 10 may also have a third fluid loop for removing heat from at least one of the first and second loops for use in a cogenerative application, such as space heating and/or water heating. In this description, unless otherwise stated, the term "loop" will also include any path in which fluid passes through the system but is not recirculated. Examples of such a path include, but are not limited to, the heating of potable water, and may also include replacement rather than recycling of condensate from the reformer's burner exhaust.

Referring to FIG. 2, there is shown a loop to provide reformate to the stack. The reformate is transferred from the FPA 34, to each of a preferential oxidation reactor (PrOx) 36 to remove carbon monoxide from the reformate, a heat exchanger 38, a fuel cell stack 40, then back to the FPA 34. A previous cooling of the reformate before entering the PrOx 36 may have occurred to reduce the partial pressure of water, or the heat exchanger 38 may be a condensing heat exchanger. The cooled reformate then enters the fuel cell stack (stack) 40, where most, but typically not all, of the hydrogen is used. Leftover reformate ("anode exhaust"), typically containing water at near-saturating concentration, leaves the stack 40 and is returned to the burner in the FPA 34. The fuel cell stack anode exhaust, which contains residual hydrogen, is burned with air or oxygen, often partially supplied by the cathode exhaust of the fuel cell stack 40, to provide heat to the reformer 34.

There is also shown in FIG. 2 a first fluid loop for providing steam to a fuel reforming reaction to produce a hydrogen-rich reformate. In the first fluid loop, fluid is pumped from a reservoir 46 to each of a first heat exchanger 48, a fuel processor assembly 34, a second heat exchanger 42, a third fluid recovery heat exchanger 44, then returned to the reservoir 46. Heat is then captured from the partially cooled burner exhaust at a first heat exchanger 42, and is typically used for steam generation or other heating within the reformer. The burner exhaust then enters a condensing heat exchanger 44. The heat exchanger 44 transfers both latent and sensible heat to other process streams, and thereby recovers water from the exhaust. The water enters a water reservoir 46, from which it is sent to other heat exchangers 42 and 48 to be converted to stream for the reforming reaction, thereby completing the loop. In this example, and those to follow, recovery of water is illustrated. It is not necessary in a stationary system that water be completely recycled, since it typically can be replenished, but the latent heat of evaporated water is potentially useful as a source of heat. Some or all of the recovered water may be discarded, and replaced by fresh water, to prevent buildup of waterborne impurities in the reformer 34.

There is also shown a second fluid loop for controlling the temperature of the fuel cell stack 40. In the second fluid loop, fluid is pumped from the third fluid recovery heat exchanger (HX3) 44 to each of a fourth cogeneration heat exchanger (HX4) 50, a fifth reformats cooling heat exchanger (HX5) 38, a fuel cell stack 40, a saturator 52, then returned to the third fluid recovery heat exchanger 44. The fuel cell coolant, also called the stack coolant, is typically, but is not limited to, deionized water or another dielectric fluid, and may include antifreeze mixtures or other components to minimize corrosion. The stack coolant removes heat generated in the stack 40 by the reaction of hydrogen and oxygen. This heat is a substantial fraction of the recoverable low temperature heat generated by the FCPS. The stack coolant, after leaving the stack 40 (which typically operates at about 70 deg. C. in this example) at about 68 deg. C., enters a saturator (SAT) 52. The saturator 52 is used to provide moisture to the air entering the stack 40 for reaction, and to control the air's temperature. Heat exchange between the stack coolant and the air may be either direct or indirect. In the direct mode, the air is directly contacted with stack coolant (preferably water in this case), becoming both warmer and properly humidified in one step. The indirect mode, used when the coolant is not entirely water, uses the coolant passing through a heat exchanger to heat water, which in turn is used to humidify and to warm the air.

After leaving the saturator 52, the stack coolant, now at about 63–66 deg. C., flows to the condensing heat exchanger 44 and acquires heat from the exhaust. A radiator 54 may be included in the stack coolant loop, for use when the stack coolant heat is not required for heating, and must instead be rejected. Such a radiator 54 can be at any of several points, such as between the saturator 52 and HX3 44, or between HX3 44 and HX5 38, for example at or near the connection to the cogeneration loop at HX4 50, or as a full or partial bypass of HX4 50.

The stack coolant then flows from HX3 44 to HX4 50, where it transfers heat to "cogeneration fluid" from the space heating system. The cogeneration fluid may be water, an antifreeze mixture, or otherwise as required by the heating system of the building. The coolant and the cogeneration fluid equilibrate in temperature, typically (with a PEM fuel cell stack) in the range of about 55 to 60 deg. C. The stack coolant now enters HX5 38 to cool the reformate, and to itself be warmed up towards stack temperature. In an alternative embodiment, not illustrated, the stack coolant path is from HX3 44 to reformate cooler HX5 38, and then to co-generation exchanger HX4 50 before returning to the stack 40. In any of these embodiments, it may be necessary to provide a condensing heat exchanger before entry of the reformate into the stack 40, because in many cases water will condense from the reformate on cooling. This function may be incorporated into HX5 38.

In the direct exchange in the saturator, in which water is transferred from the stack coolant to the incoming stack air, makeup water must be supplied to the stack coolant loop. The makeup line (not illustrated) can be supplied by either condensate from the reformate loop reservoir 46 preferred, or by makeup water from an outside supply. In either case, the makeup water will typically pass through a deionizer.

There is also shown a third fluid loop for providing space heating. Heat for cogeneration may be transferred via the third fluid loop from the fourth cogeneration heat exchanger 50 to a radiator 18 providing space heat. The cogeneration fluid leaves HX4 50 at a temperature in the range of 60–65 deg. C. and transfers this heat to the building, as described in more detail below. The fluid typically returns to the heat exchanger 50 at about 45 to 55 deg. C. Optionally, potable hot water can be made, or at least preheated, by passing potable water through the cooler region of condensing heat exchanger HX3 44. Domestic potable hot water is typically required at temperatures of about 40 to 55 deg. C. Potable water may instead or in addition be heated by the cogeneration loop, as described below.

The embodiment of FIG. 2 has several advantages. First, the stack coolant and the reformate are equilibrated before entering the stack 40. While a temperature difference between these streams is typically present, the relative temperatures of the streams are similar under various operation temperatures. Likewise, the air entering the stack 40 is equilibrated with the stack coolant. Thus, the temperatures of fluids entering the stack 40 are correlated and change little, thereby minimizing thermal stress on the stack when operating conditions change. The construction is such that this effect can often be obtained without requiring an independent or specific controller. Secondly, the portions of the system required for cogeneration are exterior to the FPA 34, and thus more accessible for repair or service. Thirdly, in the warmup stage, when the reformate is typically too rich in CO and is diverted back to the burner before entering the stack 40, the warmth of the reformate can be captured in HX3 44 and HX5 38 and used to warm the stack 40 to operating temperature, by circulation of stack coolant during the warmup phase.

In these layouts, and those described below, the number of pumps is minimized; typically, one is required per loop, if the fluid in the loops is kept separate. Such separation will normally be done, because the requirements of each of the subsystems is different. The stack cooling water requires deionized water or another suitable dielectric fluid, and hence either plastic or stainless steel heat exchangers are preferred. The space heating/cogeneration loop seldom requires deionized water, but may contain glycols as antifreeze and corrosion inhibitors. The water in the reformer/burner "loop" is preferably kept as a distinct pool, because it is largely converted into hydrogen and $CO_2$ in the reformer 34, while water to replace it is recovered from the burner exhaust and elsewhere in the system, for example as condensate from the reformate or the fuel cell exhausts. Although not illustrated, recovered water is usually purified, for example by filtration and ion exchange, before reentering the cycle.

Referring to FIG. 3, there is shown an alternative embodiment. The reformate/condensate loop is the same. The cogeneration loop is also the same. The stack coolant loop is again used to link the three heat exchanges HX3 44, HX4 50 and HX5 38. The order is now different, with the coolant interacting with HX5 38 and with HX3 44 to acquire heat before transferring heat to the cogeneration loop at HX4 50. The advantage of this arrangement is that heat can be removed from both HX5 38 and HX3 44 for transfer at HX4 50. Moreover, the reformate entering the stack 40 is typically closer to the temperature of the stack 40 than in the previous design, and a condenser to remove water from the reformate may not be required. Correlations among the temperatures of materials entering the stack are typically similar to the embodiment shown in FIG. 2, except that the direct return of the stack coolant from equilibration with the cogeneration fluid at HX4 50 will be at about 55 to 60 deg. C., significantly cooler than the stack temperature. As in FIG. 2, an optional radiator 54 for removing heat from the stack coolant is shown, here operating as a full or partial bypass around HX4 50, but with the same range of options as above.

Referring to FIG. 4, there is shown a first fluid loop for providing steam to a fuel reforming reaction to produce a hydrogen-rich reformate. In the first fluid loop, fluid is pumped from a reservoir 46 to each of a first heat exchanger 48, a fuel processor assembly 34, a second heat exchanger 42, a third fluid recovery heat exchanger 44, then returned to the reservoir 46. Also shown is a second fluid loop for controlling the temperature of the fuel cell stack 40. In the second fluid loop, fluid is pumped from a fourth cogeneration heat exchanger 50 to each of a saturator 52, a fuel cell stack 40, then returned to the fourth cogeneration heat exchanger 50. A third fluid loop is also shown for providing space heating. In the third fluid loop as shown, fluid is pumped from the third fluid recovery heat exchanger 44 to each of a fourth cogeneration heat exchanger 50, a radiator 18 for providing space heat, a fifth reformate cooling heat exchanger 38, then returned to the third fluid recovery heat exchanger 44. A fourth fluid loop for heating potable water is also shown. Heat for cogeneration may be transferred via the fourth fluid loop from the third fluid recovery heat exchanger 44 to heat potable water. Also shown is a loop to provide reformate to the stack. The reformate is transferred from the FPA 34, to each of a PrOx 36 to remove carbon monoxide from the reformate, a heat exchanger 38, a fuel cell stack 40, then back to the FPA 34.

Basically, the embodiment shown in FIG. 4 has the cogeneration loop (rather than the stack coolant) running through all three of the heat exchangers HX3 44, HX4 50 and HX5 38. The stack coolant loop only exchanges heat with the cogeneration system at HX4 50. The returning cogeneration loop fluid, typically at 45–55 deg. C., first cools the reformate in HX5 38, with both fluids leaving HX5 38 at about the 55–60 deg. C. range. This will often produce condensation in HX5 38, which is normally a benefit by preventing condensation in the stack 40. The cogeneration loop then extracts heat from the burner exhaust in HX3 44, typically being warmed to the 60–65 deg. C. range. Finally, the cogeneration fluid is warmed to about 65–68 deg. C. in HX4 50 by exchange with the stack coolant just after the coolant leaves the stack 40. This warmed fluid is then used for space heating and water heating, and returns cooled to repeat the cycle. This embodiment is typically the most efficient at extraction of heat from the FPA 34 and stack 40 system (FCPS). Another advantage is that only HX4 50 needs to be compatible with deionized water, which broadens the range of materials suitable for HX3 44 and HX5 38. A radiator 54 for use when space heating is not in use is again optionally provided in the stack cooling loop, with the above options for placement. One disadvantage to this embodiment is the lack of cooling of the reformate at HX5 38 when space heating is not occurring. Remedies for this may include, but are not limited to, an auxiliary line for circulation of stack coolant into HX5 38 for use when space heating is not occurring. Another way to cool HX5 38 is by using it to preheat water from the reservoir 46 as part of the process of making steam for the reformer 34.

In some installations, the power electronics, used to convert the variable DC voltage from the stack 40 into constant-voltage DC or AC power, can also be a significant source of heat. In such a situation, there could be an additional heat exchanger in any of the above embodiments to extract this additional heat.

Figure 6:
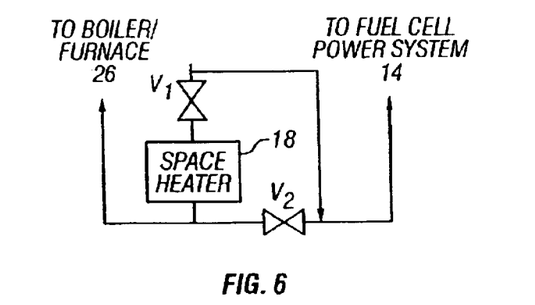
FIG. 6 is a schematic illustrating a bypass of the space heater for one embodiment of the invention.

In the embodiments of FIG. 6, an optional preheating step for potable hot water in HX3 44 is illustrated. To preserve potability, the hot water heating path is distinct from the three loops shown, and in most installations is a fourth fluid loop. Because water supplies are typically at moderate pressure, a pump is generally not required in this loop.

In each of the cogeneration systems 10 of FIGS. 2 thru 4, a fuel processor assembly 34 is shown wherein steam for reforming is supplied to the reformer by the first fluid loop. The fuel processor assembly 34 preferably has a burner to supply energy for a reforming reaction to produce the hydrogen-rich reformate, and a fuel processor exhaust from which heat is captured for transfer to a cogenerative use such as providing space heat or heating potable water. The exhaust from the fuel processor assembly 34 may be used in a cogenerative application. For example, the fuel processor exhaust may be in a heat exchange relationship with any of the fluid loops and/or the air entering the fuel processor assembly 34.

These cogeneration system 10 also have a fuel cell coolant circulating in the stack coolant loop, wherein the fuel cell coolant and the hydrogen-rich reformate are in indirect heat exchange via the cogen loop at HX5 38 to maintain a fixed temperature difference between the two mediums. Optionally, rather than a fixed temperature difference, the heat exchange at HX4 50 may be used to maintain a difference within a set range of temperatures between the fuel cell coolant and the hydrogen-rich reformate (see FIG. 4). This temperature modification helps to reduce mechanical stress in the fuel cell stack 40. The fixed temperature difference or difference within a set range of temperatures may be achieved either before, during, or after the fuel cell coolant and the hydrogen-rich reformate enter the fuel cell stack 40, but preferably before. Other options include any one or all of the fuel cell coolant, the hydrogen-rich reformate and the fuel cell stack 40 being in heat exchange with another one or all of the fuel cell coolant, the hydrogen-rich reformate and the fuel cell stack 40 to maintain the fixed temperature difference or the difference within a set range of temperatures noted above. Again, this helps reduce mechanical stress in the fuel cell stack 40. The fixed temperature difference may be as much as about 5° C.

In another embodiment, shown in FIG. 2, it is also contemplated that the fluid loop for circulating the fuel cell coolant to maintain operable conditions in the fuel cell stack 40 may be in a heat exchange relationship with and humidify the air entering the fuel cell stack 40.

Any of the embodiments of the cogeneration system 10 shown in FIGS. 1 thru 8 may optionally include a local control area network for controlling the distribution of heat for use in cogenerative applications according to individual dwelling usage. Likewise, the cogeneration system 10 may also optionally include a wide control area network for controlling the distribution of heat for use in cogenerative applications according to multiple dwelling usage.

As illustrated in FIGS. 2 thru 4, the cogeneration system 10 may have a fourth fluid loop for the heating of potable water, in which case the third fluid loop may carry a fluid for providing space heating. It is contemplated that heat may be extracted by the third fluid loop from at least one source in addition to the exhaust. The additional heat source may be, but is not limited to, the hydrogen-rich reformate, a reformer 34, power electronics, a furnace, or a boiler.

As shown in FIGS. 2 thru 4, the cogeneration system 10 may optionally include a means for cooling the stack coolant loop. The means for cooling may be any conventional cooling means, including, but not limited to, a radiator 54 or any two fluid heat exchange system to move the heat to a location in the system where it may be used (e.g., low-grade process heating). There may also be a controller to selectively activate the radiator 54 when space heating is not being provided by the system. Any of the loops in the cogeneration system may be cooled in this fashion, if desired. Optionally, a condensing radiator may be used to cool any of the system fluid loops, while additionally recovering water from the cogeneration system exhaust. In such a configuration, heat could be released from the exhaust into one or both of the fourth fluid loop and the second fluid loop, with the second fluid loop in a heat exchange relationship with the third fluid loop to recover and utilize heat extracted from the cogeneration system 10 in a cogenerative application. The optional condensing radiator may have two zones: a first zone in which heat is transferred to a fluid loop providing space heating and a second zone in which heat is transferred to a supply of, for example, potable water. There may also be optional heat transfer coils over which the water condensed from the exhaust may flow. Then, the water may be collected for return to the cogeneration system 10.

In practice, there is usually imbalance between the need for electricity and the need for space heating. In warm weather, space heating is often not needed, and the heat generated in electricity production can be more than sufficient to heat potable water. For this situation, provision of a radiator 54 in the stack coolant loop is preferred. In cold weather, the heat demands of space heating can exceed the supply of energy available from the fuel cell stack 40 plus the fuel processor assembly 34 (collectively, the Fuel Cell Power System, or FCPS). In principle, the fuel processor 34 could be oversized so that it can also provide energy for space heating. In practice, it will usually be more cost effective to provide a conventional furnace or boiler 26 to directly heat the space heating loop, and to arrange for the heat required for space heating to be supplied by either or both of the FCPS and the furnace.

Figure 5:
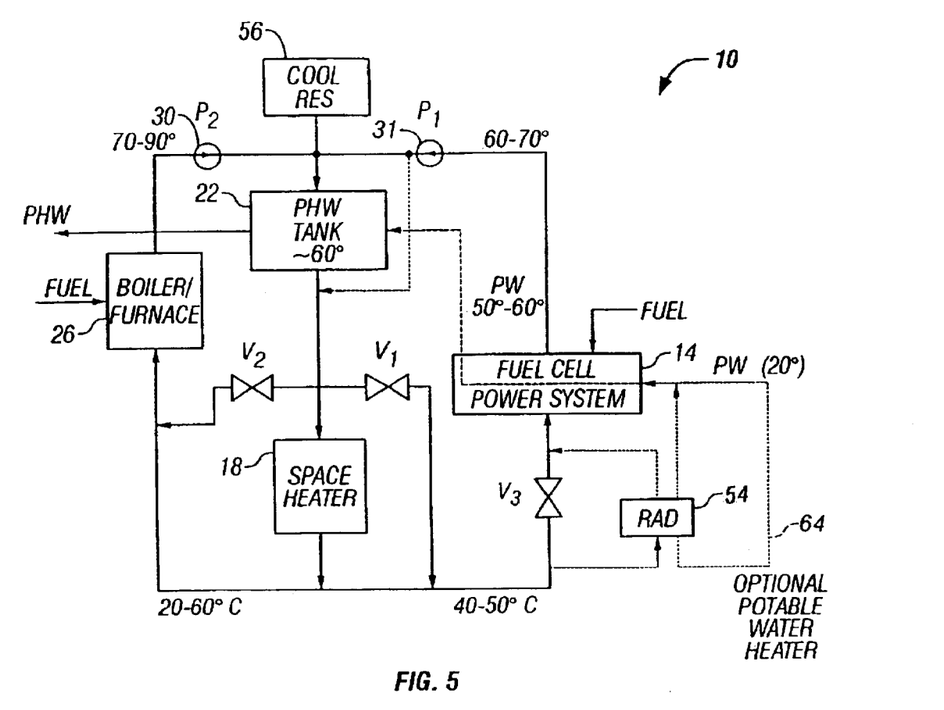
FIG. 5 is a schematic illustrating one embodiment of the invention including an optional boiler/furnace and an optional potable hot water tank.
Figure 7:
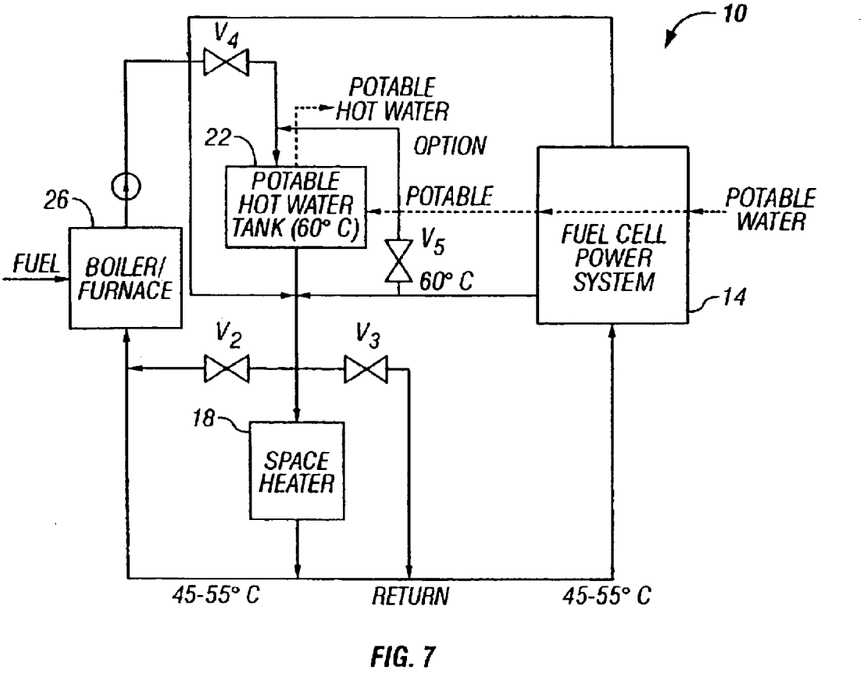
FIG. 7 is a schematic illustrating an option to bypass the potable hot water tank for either the FCPS or the boiler/furnace for one embodiment of the invention.

The optional furnace, shown in FIGS. 5 and 7, may provide heat for at least one of space heating and potable water heating. There may also be a controller for providing sufficient heat for at least one of space heating and potable water heating by selectively activating at least one of the furnace 26 and the FCPS 14. The furnace 26 may also optionally be used to provide supplemental heat to the third fluid loop for use in one or more of space heating, potable water heating, and provision of startup heating to the cogeneration system 10. The optional furnace 26 may be connected with the third fluid loop. This connection may be either in parallel or in series.

FIGS. 5 and 7 also show an optional potable hot water tank 22. The potable hot water may derive heat from the FCPS 14, the optional furnace 26, or it may be heated by the hot water heater 22, itself, using any conventional heating means.

As shown in FIG. 6, the space heater 18 may be optionally bypassed using valves V1 and V2. In bypass mode, the heat that would have been used as space heat would then be used in either one or both of the FCPS 14 and the optional furnace 26, depending on which of the valves, V1 and V2, are in the open position, as shown in FIG. 5.

As shown in FIG. 7, the potable hot water tank 22 may be optionally bypassed using valves V4 and V5. In bypass mode, the heat that would have been used to heat potable water would then be used in either one or both of the FCPS 14 and the space heater 18, depending on which of the valves, V2 and V3, are in the open position.

Figure 8:
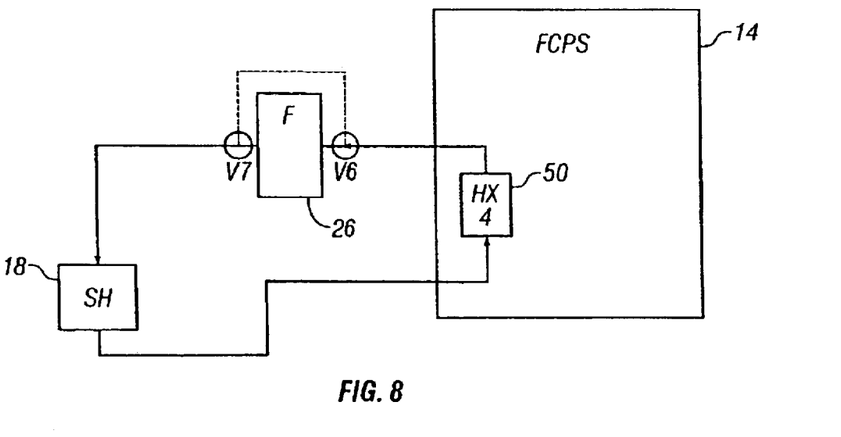
FIG. 8 is a schematic illustrating an option to bypass the furnace for one embodiment of the invention.

The optional furnace 26 may also be bypassed, as shown in FIG. 8. The heat from the FCPS 14 would then be used by the space heater 18 to supply heat to a building, without supplemental heat from the furnace 26. This can be controlled by the user so that the desired level of space heating is achieved throughout the year.

It is also contemplated, as shown in FIGS. 2 thru 4, that the invention may have a heat exchange system for the provision of electricity and heat from the cogeneration system 10. Such a heat exchange system could have a fuel cell stack 40 for generating electricity from the hydrogen-rich reformate. The heat exchange system could also have a plurality of dissociated fluid loops, such that there is a first fluid loop for providing steam to a fuel reforming reaction to produce a hydrogen-rich reformate and a reformer exhaust, a second fluid loop for controlling the temperature of the fuel cell stack 40, and a third fluid loop for removing heat from at least one of the fuel reforming reaction and the fuel cell stack 40 for use in a cogenerative application. The heat exchange system could also have a plurality of heat exchangers which transfer heat among the dissociated fluid loops. There could be a first heat exchanger 38 between the hydrogen-rich reformate and at least one other system fluid, a second heat exchanger 44 between the reformer exhaust and at least one other fluid, and a third heat exchanger 50 between the second fluid loop and the third fluid loop. This heat exchange system may produce heat for one or both of heating potable water and providing space heating.

As shown in FIGS. 2 thru 4, it is contemplated that the heat exchange system may include a means for cooling the second fluid loop. There could also be a controller for selectively activating the means for cooling the second fluid loop when space heating is not being provided by the cogeneration system 10. The optional means for cooling could be any conventional cooling means, including, but not limited to, a radiator 54. There may also be a fourth fluid loop in a heat exchange relationship with at least one of the first fluid loop and the second fluid loop for the preheating of potable hot water. The optional fourth heat exchanger may also be used to transfer heat among the reformer exhaust, the second fluid loop and at least one other fluid. An additional heat exchange loop could also be placed within any or all of the system heat exchangers.

Optionally, one or more of the heat exchangers may be condensing heat exchangers for removal of water from a gas. The gas may be reformate, reformer exhaust, or any other gas found in the cogeneration system 10. The optional condensing heat exchanger may be used to transfer heat from at least one of the second fluid loop and the third fluid loop to heat potable water. The heat exchange system may also include a hot water tank for storing hot potable water.

It is also contemplated, as shown in FIG. 5, that the heat exchange system may have an optional furnace 26 for providing heat for any or all of space heating, potable water heating, and provision of startup heating for the cogeneration system 10. The optional furnace 26 may also be used to provide supplemental heat to the third fluid loop for use in any or all of space heating, potable water heating, and provision of startup heating for the cogeneration system 10. The optional furnace 26 may be connected in parallel with the third fluid loop or in series with the third fluid loop. The optional furnace 26 may also be regulated by a controller. The optional controller could be used to provide sufficient heat for either one or both of space heating and potable water heating by selectively activating any or all of the furnace 26 and the FCPS 14. The heat exchange system may optionally include a means for using unheated external water, for example, cool reservoir 56, for replenishing water in any or all of the fluid loops. This external water could come from any type of water reservoir.

It is noteworthy that the flow of fluids in any of the heat exchangers may be either co-current or counter current. In HX4 50, in the embodiments shown, the co-current mode is preferred, so that both the cogeneration loop and the stack coolant loop leave the heat exchanger 50 at similar temperatures near 60 deg. C. If a condensing heat exchanger is used as HX3 44, particularly in the embodiment of FIG. 4, it is also preferably run in co-current mode, in the sense that cooler streams are introduced at the top and flow downwards and out, to maximize heat and water recovery. Countercurrent flow is somewhat preferred in HX5, but not necessary.

While the specific embodiments have been illustrated and described, numerous modifications come to mind without significantly departing from the spirit of the invention and the scope of protection is only limited by the scope of the accompanying claims.

We claim:

1. A cogeneration system comprising:
   a first fluid loop for providing steam to a fuel reforming reaction to produce a hydrogen-rich reformate;
   a fuel cell stack for generating electricity from the hydrogen-rich reformate;
   a second fluid loop for controlling the temperature of the fuel cell stack;
   a third fluid loop for removing heat from at least one of the first and second loops for use in a cogenerative application; and
   a local control area network for controlling the distribution of heat for use in cogenerative applications according to individual dwelling usage.

2. The cogeneration system of claim 1 further comprising:
   a fuel processor assembly, wherein steam is supplied by the first fluid loop, the fuel processor assembly comprising a burner for burning a fuel to supply energy for a reforming reaction to produce the hydrogen-rich reformate and a fuel processor exhaust from which heat is captured for transfer to a cogenerative use.

3. The cogeneration system of claim 1 further comprising:
   a fuel cell coolant circulating in the second fluid loop, wherein the fuel cell coolant and the hydrogen-rich reformate are in heat exchange to maintain a fixed temperature difference in order to reduce mechanical stress in the fuel cell stack.

4. The cogeneration system of claim 3, wherein the fixed temperature difference is achieved before the fuel cell coolant and the hydrogen-rich reformate enter the fuel cell stack.

5. The cogeneration system of claim 1 further comprising:
   a fuel cell coolant circulating in the second fluid loop, wherein the fuel cell coolant and the hydrogen-rich reformate are in heat exchange to maintain a difference within a set range of temperatures in order to reduce mechanical stress in the fuel cell stack.

6. The cogeneration system of claim 5, wherein the difference within a set range of temperatures is achieved before the fuel cell coolant and the hydrogen-rich reformate enter the fuel cell stack.

7. The cogeneration system of claim 1 further comprising:
   a fuel processor assembly for producing the hydrogen-rich reformate using an air blower and an exhaust which is used in a cogenerative application;
   wherein the fuel processor exhaust is in a heat exchange relationship with the first fluid loop and the air from the air blower entering the fuel processor assembly.

8. A cogeneration system comprising:
   a first fluid loop for providing steam to a fuel reforming reaction to produce a hydrogen-rich reformate;
   a fuel cell stack for generating electricity from the hydrogen-rich reformate;
   a second fluid loop for controlling the temperature of the fuel cell stack;
   a third fluid loop for removing heat from at least one of the first and second loops for use in a cogenerative application; and,
   a wide control area network for controlling the distribution of heat for use in cogenerative applications according to multiple dwelling usage.

9. The cogeneration system of claim 1 further comprising:

a fourth fluid loop for the heating of potable water;

wherein the third fluid loop carries a fluid for providing space heating.

10. The cogeneration system of claim 1, wherein heat is extracted by the third fluid loop from at least one source in addition to the exhaust.

11. The cogeneration system of claim 10, wherein the additional heat source is selected from the group consisting of the hydrogen-rich reformate, a reformer, power electronics, a furnace and a boiler.

12. A cogeneration system comprising:

a first fluid loop for providing steam to a fuel reforming reaction to produce a hydrogen-rich reformate;

a fuel cell stack for generating electricity from the hydrogen-rich reformate;

a third fluid loop for removing heat from at least one of the first and second loops for use in a cogenerative application;

a fourth fluid loop for providing heat for potable hot water; and a condensing radiator for recovering water from the cogeneration system exhaust and releasing heat from the exhaust into at least one of the fourth fluid loop and the second fluid loop;

wherein the second fluid loop is in a heat exchange relationship with the third fluid loop to recover and utilize heat extracted from the cogeneration system in a cogenerative application.

13. The cogeneration system of claim 12, wherein the condensing radiator has a first zone in which heat is transferred to a fluid loop providing space heating and a second zone in which heat is transferred to a supply of potable water.

14. The cogeneration system of claim 13 further comprising:

heat transfer coils;

wherein the water condensed from the exhaust flows over the heat transfer coils and is collected for return to the cogeneration system.

15. The cogeneration system of claim 2 further comprising:

a furnace for providing heat for at least one of space heating and potable water heating.

16. A cogeneration system comprising:

a first fluid loop for providing steam to a fuel reforming reaction to produce a hydrogen-rich reformate;

a fuel cell stack for generating electricity from a hydrogen-rich reformate;

a second fluid loop for controlling the temperature of the fuel cell stack; and a third fluid loop for removing heat from at least one of the first and second loops for use in a cogenertive application a fuel processor assembly, wherein steam is supplied by the first fluid loop, the fuel processor assembly comprising a burner for burning a fuel to supply energy for a reforming reaction to produce the hydrogen-rich reformate and a fuel processor exhaust from which heat is captured for transfer to a cogenerative use;

a furnace for providing heat for at least one of space heating and potable water heating; and, a controller for providing sufficient heat for at least one of space heating and potable water heating by selectively activating at least one of the furnace, the fuel cell stack and the fuel processor assembly.

17. A cogeneration system comprising:

a first fluid loop for providing steam to a fuel reforming reaction to produce a hydrogen-rich reformate;

a fuel cell stack for generating electricity from a hydrogen-rich reformate;

a second fluid loop for controlling the temperature of the fuel cell stack; and a third fluid loop for removing heat from at least one of the first and second loops for use in a cogenertive application;

means for cooling the second fluid loop; and a controller for selectively activating the means for cooling the second fluid loop when space heating is not being provided by the system.

18. The cogeneration system of claim 1 further comprising:

a furnace for providing supplemental heat to the third fluid loop for use in at least one of space heating, potable water heating, and provision of startup heating to the cogeneration system.

19. The cogeneration system of claim 18, wherein the furnace is connected in parallel with the third fluid loop.

20. The cogeneration system of claim 18, wherein the furnace is connected in series with the third fluid loop.

* * * * *